United States Patent [19]

Iwase

[11] 4,337,552
[45] Jul. 6, 1982

[54] AUTOMATIC CRAB LEG SHELL CUTTING-IN MACHINE

[75] Inventor: Shigeo Iwase, Hakodate, Japan

[73] Assignee: Taiyo Seisakusho Manufacturing Co. Ltd., Hakodate, Japan

[21] Appl. No.: 210,758

[22] Filed: Nov. 24, 1980

[30] Foreign Application Priority Data

Nov. 22, 1979 [JP] Japan .................................. 54-150673

[51] Int. Cl.³ ............................................ A22C 29/02
[52] U.S. Cl. ......................................... 17/71; 83/425.2
[58] Field of Search .................... 17/53, 71, 72, 73, 74, 17/75, 76; 83/425.2, 428, 435, 435.2

[56] References Cited

U.S. PATENT DOCUMENTS

| | | | |
|---|---|---|---|
| 1,584,797 | 5/1926 | Neal | 83/873 |
| 2,293,133 | 8/1942 | Halferty | 17/53 |
| 3,495,294 | 2/1970 | Reinke | 17/71 X |
| 3,867,740 | 2/1975 | Lapine et al. | 17/72 |

FOREIGN PATENT DOCUMENTS

| | | | |
|---|---|---|---|
| 83637 | 8/1971 | German Democratic Rep. | 17/53 |
| 1343533 | 1/1974 | United Kingdom | 17/71 |

Primary Examiner—Willie G. Abercrombie
Attorney, Agent, or Firm—George B. Oujevolk

[57] ABSTRACT

An automatic crab leg shell cutting-in machine for processing crabs' legs. In order to charge the cutting-in machine with crab legs at a predetermined processing rate, the upper and lower feed-belts are provided in the longitudinal direction of the machine. Rotary cutting-knives are arranged therebetween on the both sides of a cutting-in section and depressing plates serving to depress the upper and lower feed-belts are provided opposite each other in such a manner that the upper and lower feed-belts have an increased or decreased clearance therebetween in the cutting-in section depending upon the dimensional conditions of a crab leg to be processed. The depressing plates are held so as to be vertically displaced with the aid of resilient means or shock absorbing means, whereas the rotary cutting-knives are arranged so as to approach the longitudinal axis of the feed-belts or move away therefrom in cooperation with resilient means or shock absorbing means and bell cranks. Further guide-members having a U-shaped cross section are provided in front and behind the cutting-in section of the machine.

5 Claims, 4 Drawing Figures

AUTOMATIC CRAB LEG SHELL CUTTING-IN MACHINE

BACKGROUND OF THE INVENTION

1. Field of the Invention

The present invention relates to an automatic crab leg shell cutting-in machine in which a cutting-in operation is performed from the both sides thereof in the substantially horizontal direction.

2. Description of the Prior Art

Heretofore, the practice has been to cut in shoulder meat, cut off a part of the crab leg or cut in it by means of a kitchen knife and then push out the crab meat with the aid of a rod such as a chop-stick or the like.

However, the conventional steps for cutting-in crab legs as described above have been accomplished only at a reduced operational efficiency. In face to improve the conventional steps of operations for achieving an increased efficiency, a variety of automatic cutting-in machines have been already proposed. Due to the fact conventional automatic cutting machines deeply cuts into the contents (leg meat) of the crab legs at the same time as cutting in their shells, it is a recognized drawback of conventional machines that the crab meat becomes damaged when is taken it out of the shell after completion of the cutting operation. The required crab meat is produced at a greatly reduced rate and the commercial value of the crab meat obtained is reduced due to the miserable appearance of the product obtained.

OBJECT OF THE INVENTION

Thus it is an object of the present invention to provide an automatic crab leg shell cutting-in machine which is completely free of the foregoing drawbacks and where the cutting-in operation is performed at an improved efficiency with the result that the content (crab meat) of the crab legs is obtained in the same configuration as that of the leg shell.

It is another object of the present invention to provide an automatic crab leg shell cutting-in machine which has an excellent compatibility with regard to the size, length and configuration of crab legs to be processed by using rotary cutting-knives and at the same time enlarging or reducing the clearance between upper and lower feed belts in accordance with the dimensional conditions of the crab legs.

SUMMARY OF THE INVENTION

To accomplish the aforementioned objects of the present invention there is provided a new and unique automatic crab leg shell cutting-in machine for processing leg shells of crab. which are charged into a cutting-in section at a predetermined rate, characterized in that upper and lower feed-belts are provided in the longitudinal direction of the machine in such a manner that rotary cutting-knives are arranged therebetween on both sides of the cutting-in section and depressing plates are used to depress the upper and lower feed-belts and are located oppostie each other in such a manner that the upper and lower feed-belts have an increased or decreased clearance therebetween in the cutting-in section depending on the dimensional conditions of crab legs to be processed, wherein said depressing plates are held so as to be vertically displaced by means of resilient members or shock absorbing members and moreover said rotary cutting-knives are adapted to approach toward the longitudinal axis of the feed-belts or move away therefrom owing to the cooperative function of the resilient members or shock absorbing members and bell cranks.

It is preferable with the present invention that the rotary cutting-knives which are arranged on both sides of the cutting-in section are constructed in the form of disc having a cutting-edge along the periphery thereof.

Preferably, the rotary cutting-knives are constructed in the form of discs having a serrated cutting-edge along the periphery thereof.

It is preferable that the upper and lower feed-belts in the form of endless belt have slip preventive rugged surfaces. Although, an endless belt having no slip-preventive-means is also acceptable.

The depressing plates are made of any suitble material, such as, metal, plastic etc., as far as it is capable of depressing the feed-belts as required. In view of mechanical strength and friction between the depressing plate and feed-belt metallic material is most preferable.

It is preferable that means for holding the depressing plates be so constructed that the upper and lower feed-belts have an increased or decreased clearance therebetween in accordance with the dimensional conditions of crab legs supplied into the clearance. For instance, the depressing plates may be held by means of resilient member, such as a coil spring or shock absorbing member such as a hydraulic damper which is arranged at the both ends or at the central part thereof. In practice it is most preferable that the depressing plate is pivotally secured to one end of bell crank.

In order to prevent the crab legs being processed or the processed crab legs from being thrown away from the upper and lower feed-belts there are provided U-shaped guide members which are made either of metal or of plastic or the like material. In view of mechanical strength to be given to the guide members, metallic material is most preferable.

The invention as well as other objects and advantages thereof will be more apparent from the following detailed description and the accompanying drawings, in which:

BRIEF DESCRIPTION OF THE ACCOMPANYING DRAWINGS

DETAILED DESCRIPTION OF PREFERRED EMBODIMENT OF THE INVENTION

Figure 1:
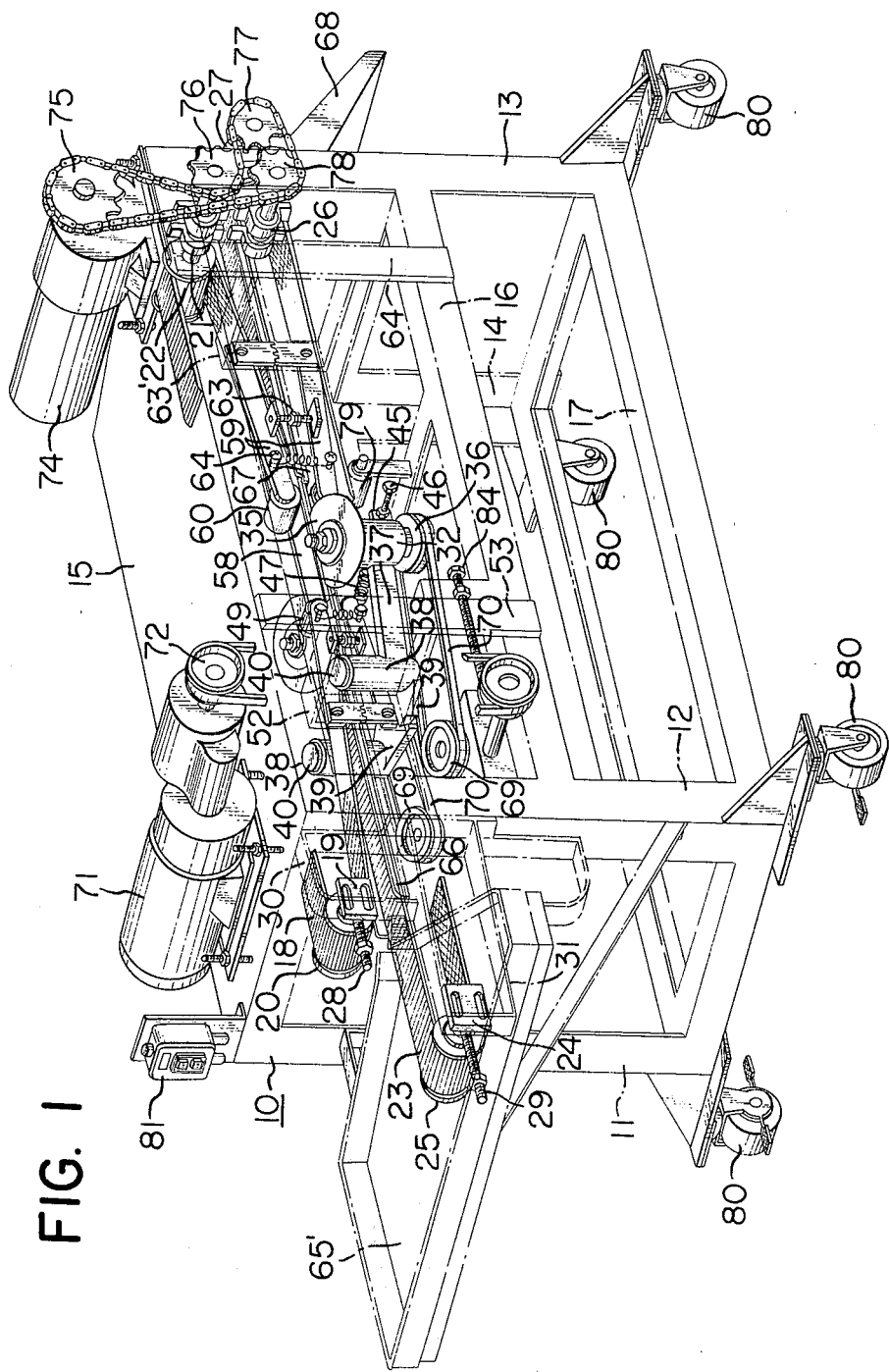
FIG. 1 is a whole perspective view of an automatic crab leg shell cutting-in machine in accordance with a preferred embodiment of the present invention.
Figure 2:
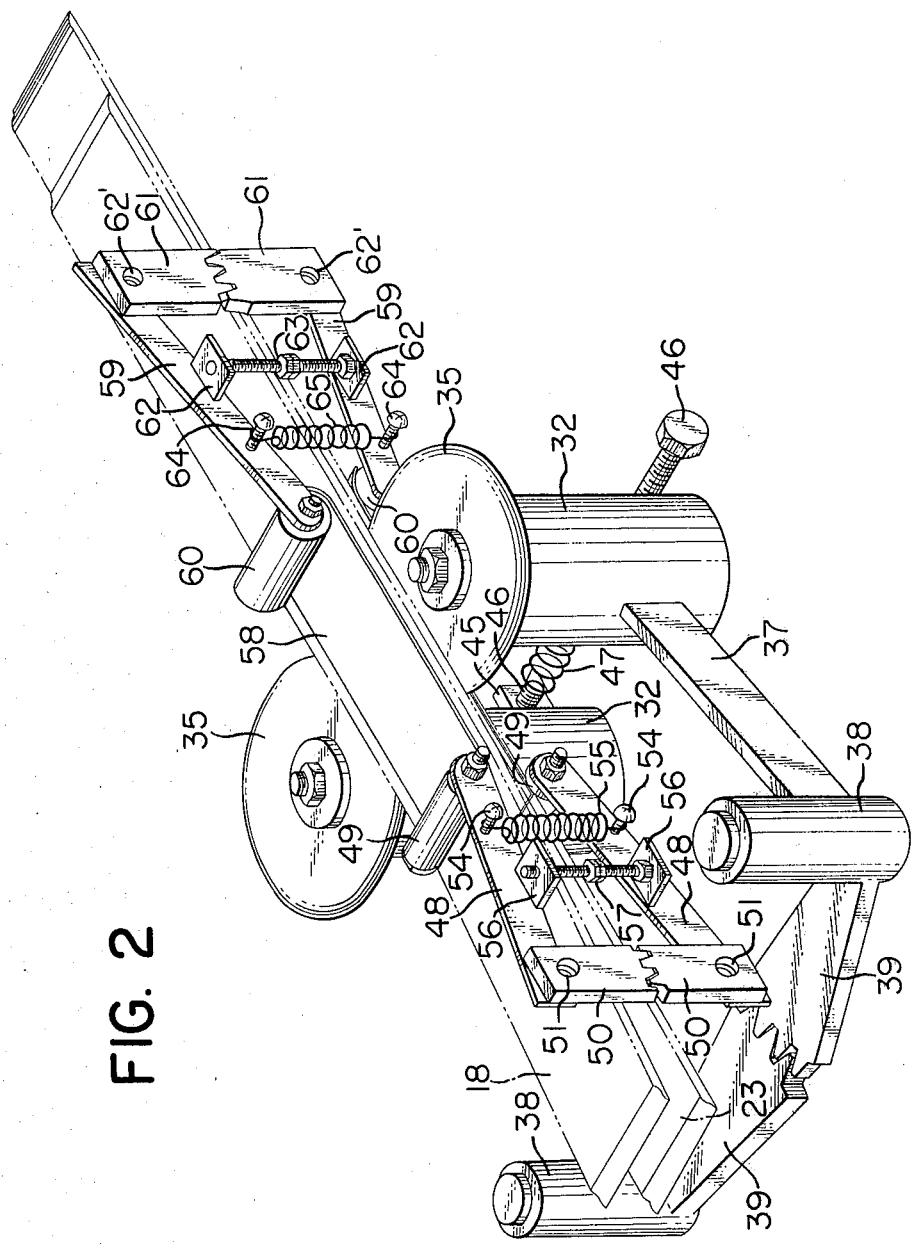
FIG. 2 is a partial perspective view of a cutting-in section of the automatic crab leg shell cutting-in machine in FIG. 1, shown in an enlarged scale.

Now the present invention will be described in a greater detail with reference to the accompanying drawings which illustrate a preferred embodiment of the present invention.

The machine of the invention is housed in a housing frame 10.

Specifically, said housing frame 10 comprises four support legs 11 through 14 made of angle steel, a top plate 15 fixedly secured to said support legs 11 through 14 at their upper ends by welding, an intermediate shelf 16 and a reinforcement shelf 17 fixedly secured to them at their lower ends by welding.

Also used in the invention is an upper endless feed-belt 18, of which one end portion is supported by means of a tail pulley 20 rotationally disposed on an upper take-up support 19 on the feeding side and other end portion is supported by means of a driving pulley 22 rotationally disposed with the aid of a pillow block 21 on the delivery side.

Likewise, there is a lower endless feed-belt 23 which has a length a little longer than the upper feed-belt 18 on the both feeding and delivery sides. Said lower feed-belt 23 is supported by means of a tail pulley 25 rotationally disposed on a lower take-up support 25 on the feeding side at one end portion and by a driving pulley 27 rotationally disposed with the aid of a lower pillow block 26 on the delivery side at its other end portion.

Adjustment bolts 28 and 29 serve to pull the tail pulleys 20 and 25 in the axial direction so that the upper and lower feed-belts 18 and 23 are loosened or tightened by operating said adjustment bolts 28 and 29 (see FIG. 1).

Take-up plates 30, 31 are fixed to the housing frames 11 and 12 of the machine on the feed side. The lower plate has a longer projection than the upper plate. The respective take-up plates 30 and 31 are provided with said upper take-up support 19 and the lower take-up support 24 secured thereto. These supports 19 and 24 support the take-up pulleys.

Vertically arranged on each side of the upper and lower feed-belts 18 and 23 is a cylindrical bearing box 32. Bearing box 32 has a shaft 33 which has a rotary cutting-knife 35 fixedly secured thereto via a washer 34 at its upper end and further has a secondary pulley 36 at its lower end 41.

Figure 4:
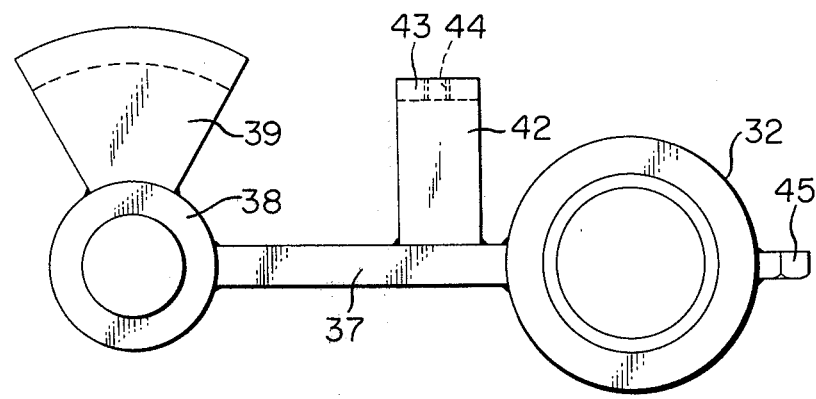
FIG. 4 is a plan view of the rotary cutting-knife and bell crank in FIG. 3.

On the periphery of the bearing box 32 is a bell crank 37 of which one end is welded thereto. Also, the horizontal bell crank 37 is formed with a gear segment 39 at its other end which is integral to its hollow shaft 38 (see FIGS. 1 and 4).

Said hollow shaft 38 is rotationally supported on a pivotal pin 40.

Further said pivotal pins 40 are fixed to a support member (not shown) at a predetermined distance therebetween, which is mounted in the form of inverted U-shape between the intermediate support-shelves 16.

Figure 3:
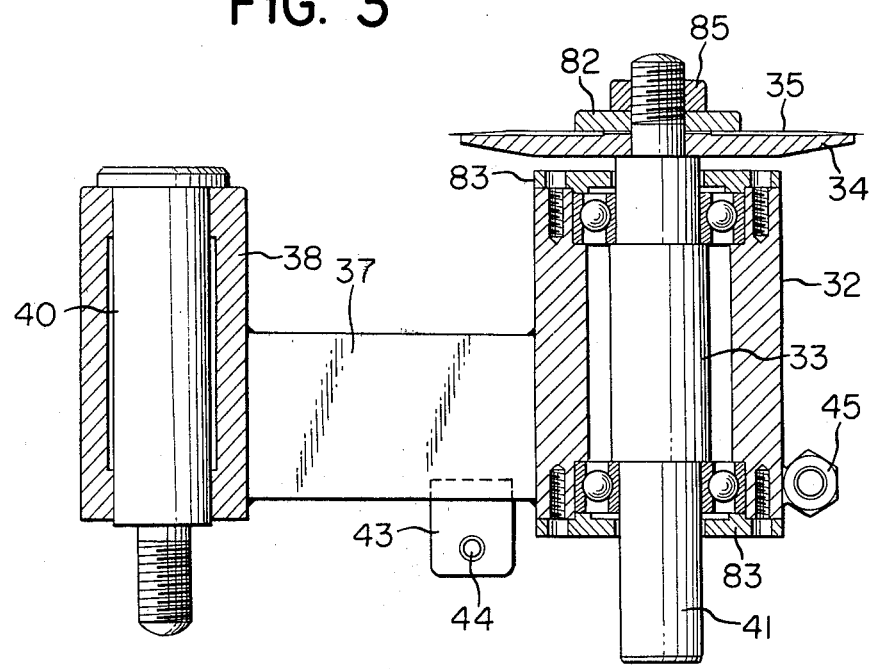
FIG. 3 is a vertical sectional view of a rotary cutting-knife and bell crank in the cutting-in section, shown in a more enlarged scale.

A horizontally extending adjustment bracket 42 secured to the inner side wall of the bell crank 37. As apparent from the drawings, said adjustment bracket 42 has a short vertical extension 43 which has a threaded hole 44, but it is to be noted that the threaded hole 44 is provided only on one of the bell cranks 37. A long adjustment bolt is screwed in the threaded hole 44, until its top end abuts against the vertical extension 43 of the other bell crank 37 (not shown), whereby any collision between the rotary cutting-knives 35 of the cylindrical bearing boxes 32 and excessive cutting-in of the cutting edge of the rotary cutting-knives 32 is satisfactorily prevented (see FIG. 3).

An attachment piece 45 is welded to the outer wall of the cylindrical bearing box 32. Said attachment piece 45 has a bolt 46 screwed therethrough and a coil spring 47 is horizontally disposed between the top ends of said bolts 46.

Owing to the arrangement of the bolts 46 and coil spring 47 it is ensured that the both rotary cutting-knives 35 are always located in position between the feed-belts 18 and 23 in such a manner that they are spaced from the longitudinal axis of the feed-belts according to the dimensional conditions of crab legs to be processed.

A pair of vertically operating bell crank members 48 are disposed above and below the feed-belts 18 and 23 on the feeding side of the cutting-in section, said bell cranks 48 having a depressing member 49 secured to one end thereof and further have a rectangular plate 50 secured to the other end thereof.

The rectangular plates 50 are formed with gear teeth along the circular edges which are in engagement with each other and are pivotally supported by means of a support member 52 with the aid of a pivotal pin (not shown) which extends through a drilled hole 51 opened in position on the rectangular plate 50.

The support member 52 is secured to a vertical plate 53 of which both ends are fixed to the intermediate support shelf 16 and top plate 15 and projects inwards therefrom in the form of a hook.

Fastened in the side wall of the bell crank member 48 are set-screws 54. These set screws 54 serve to anchor a vertically extending coil spring 55. Secured to the side wall of the bell crank members 48 are attachment pieces 56. The attachment pieces 56 have a vertically extending adjustment member 57 fastened therethrough so that escessive depressing is prevented by the upper and lower feed-belts 18 and 23 in the cutting-in section.

The feed-belts are depressed by means of a depressing plate 58. The depressing plate 58 is provided with an inclined piece at the other end and is adapted to be depressed by means of a depressing roller 60 arranged at the front end of the vertically operating bell crank 59 on the delivery side of the cutting-in section.

A pair of rectangular plates 61 are secured to the bell cranks 59 on the delivery side and formed with gear teeth along the circular edges in engagement with each other. Further the bell cranks 59 are provided with attachment pieces 62 fixed to the side wall thereof which has a vertically extending adjustment member 63 fastened therethrough so that excessive depressing is prevented for the upper and lower feed-belts 18 and 23 in the cutting-in section.

The reference numerals 64 designate a set-screw secured to the side wall of the bell cranks 59. Between the set-screws 64 is disposed a vertically extending coil spring 65 of which both ends are anchored to the set screws.

The rectangular plates 61 are pivotally supported by means of a support member 63' with the aid of a pivotal pin (not shown) which extends through a drilled hole 62'.

The support plate 63' is secured to a vertical plate 64 of which both ends are fixed to the intermediate support shelf 16 and top plate 15 and projects inwards in the form of a hook.

Crab seafood raw material is fed through an inlet chute which has a feed through. Between the front end of the feed through and the lower feed-belt 23 is a narrow clearance.

On the feed side of the machine, a guide member 66 is disposed on the frame between the cutting-in section and the inlet chute 65' and which has a substantially U-shaped cross section. It is to be noted that the guide member 66 has a width equivalent to those of the upper and lower feed-belts 18 and 23 and is integral with both side walls so that the upper feed-belt 18 is received therein.

On the delivery side of the machine, a guide member 67 is disposed on the frame between the cutting-in section and the outlet chute 68. It is to be noted that the guide member is of shorter length than that of the guide member 66 on the feed side of the machine but has the substantially same width and side wall height as those of guide member 66. The drive means for the knives includes a gear box 68 with driving shafts and driving pulleys 69 secured thereto which serve to drive the secondary pulleys 36 of the cutting knives 35, by means of V-belts 70.

Also part of the drive means for the knives is a first motor 71 with a primary pulley 72. The gear box 68 also has a primary pulley 73. There is also a second motor 74 for driving the feed-belts by means of a chain sprocket 75. A chain sprocket 75 drives the main pulley 22 while a chain sprocket 77 is arranged to drive the main pulley 27. Supported by the pillow block 26 is a chain sprocket 78. For the lower feed belt there is a return idler 79. There is also a caster 80, a main switch 81, a collar 82 for tightening the rotary knives, an end plate 83 for the cylindrical bearing box 32 and a nut 85 for tightening the rotary cutting knives.

Disposed on both sides of the work station is an adjustment bolt 84 for the purpose of displacing the gear box forwards or backwards. This adjustment bolt 84 is adapted to engage a nut fixed to the frame plate.

OPERATION OF THE INVENTION

The operation of the automatic crab leg shell cutting-in machine is as follows:

First, operators charge the inlet chute 65' with a number of crab legs and then they feed crab legs into the space between the upper and lower feed-belts 18 and 23 piece by piece manually or with the aid of a feeder (not shown) with the back portion of the crab leg located above and the belly portion of the same location below and vice versa. Now the crab leg moves forwards together with the travelling upper and lower feed-belts 18 and 23 to be guided into the cutting-in section, while displacing one of the bell cranks 48 (on the upper side) upwards against the resilient force of the coil spring 55 and displacing the other one (on the lower side) downwards. As the crab leg enters the cutting-in section, it moves forwards further with its shell clamped between the upper and lower feed-belts 18 and 23 and the side walls of the leg shell are cut in to a certain depth by means of the rotary cutting-knives 35 and 35. Then after completion of the cutting-in operation the crab leg is discharged onto a receiving hopper or a belt conveyor for a subsequent processing process via the outlet chute 68.

The cutting-in depth of the rotary cutting-knives 35 varies, depending on the thickness of the crab leg shell and is controlled within a certain extent of deviation with the aid of the washer 34 disposed below the rotary cutting-knife (see FIG. 3) and the horizontal adjustment member.

Usually, the crab leg has an inward curved side wall the curvature of which varies appreciably in dependence on the position on the crab leg such as first leg portion, second leg portion. The cutting-in machine of the invention makes it possible that the rotary cutting-knives 35 are displaced in accordance with the curvature of the side wall of the crab leg to be processed, said crab leg moving together with the upper and lower feed-belts, so that the intended cutting-in operation is performed.

Specifically, the rotary cutting-knives 35 arranged on the both sides of the cutting-in section are displaced in such a manner that they approach toward the axis of the feed belts or move away therefrom in cooperation with the horizontally extending coil spring 47 and horizontally operating bell cranks 37, following the circular truck about the center of the hollow pivotal shafts 38.

In order to eliminate the possibility that the crab leg to be processed is thrown out from the upper and lower feed-belts when it is charged into the space between the upper and lower feed-belts in a wrong manner, the cutting-in machine of the invention is provided with the guide members in the U-shaped form.

Owing to the arrangement that the upper and lower feed-belts have an increased or decreased clearance between them depending on the size and length of the crab leg to be processed and moreover the rotary cutting-knives are displaced in accordance with the curvature of the side shell of the crab leg, because the cutting-in lines are horizontally formed on the side walls of the crab shell.

Accordingly, the present invention provides a particular advantage that crab meat having the same configuration as that of the leg shell is obtained without any danger of splitting the crab meat after the cutting-in operation or damaging its appearance.

Further the present invention provides an additional advantage in that there is a high yield rate is ensured for processing after completion of cutting-in operation without any danger of reduced commercial value of the crab meat.

It should be of course understood that the horizontally and vertically extending coil springs may be replaced with shock absorbing devices having the same functional properties as those of the aforesaid coil springs and the depressing plates secured to the vertically operating bell cranks at one end may be replaced with hydraulic cylinders pivotally secured to the housing frame.

What is claimed is:

1. An apparatus for automatically cutting the shell from crab-legs comprising in combination:
   (a) a frame (10), an elongated top plate (15) supported on said frame (10), said top plate (15) defining a work zone having an input feed hopper (65') at one end for receiving crab-legs and a defined output chute (68) at the other end;
   (b) upper and lower endless feed belts (18, 23) each rotationally supported on rear and drive pulleys (20, 22, 25, 27), said pulleys being supported on said frame (10) at said one and the other ends of said work zone;
   (c) gear boxes (32) defining a work station with a a feed side supported on said frame on both sides of said belts, said gear boxes (32) having a shaft (33) with rotary cutting-knife means (35);
   (d) motor drive means (7,, 74) operatively coupled for driving said feed belts and said cutting-knife means;
   (e) horizontal bell crank lever means (37) extending from each of said gear boxes towards the feed side of said work station, gear teeth (39) on each of said horizontal bell rank lever means (37) in engagement toward said feed side, resilient means (46, 47) connecting said gear boxes between both sides of said belts so that the gear boxes and cutting-knife means are properly spaced from said belts to work on crab-legs passing therebetween;

(f) at least one depressing plate (58) at said work station engaging said upper feed belt (18), front and rear rollers (49, 69) pressing down on said depressing plate (58);

(g) rear upper and lower bell crank members, said upper bell crank members (48) being connected to said rear roller (49), said upper and lower bell crank members being disposed above and below the feed belts on said feed side, said bell crank lever members (48) having upward and downward extending vertical plates (50) with gear teeth in engagement at the respective lower and upper ends of said vertical plates; and, (h) forward upper and lower bell crank members (59) each having a vertical plate (61) with teeth in engagement at the respective upper and lower ends of said vertical plates, spring means extending between said rear upper and lower bell crank members and said forward upper and lower bell crank members; whereby, crab-legs fed from said input feed hopper (65') are passed forward by said feed belts to said work station where the crab shells are cut and then onto said output chute (68).

2. An apparatus as claimed in claim 1 wherein guide members having a U-shaped cross section are provided in front of and behind the work station.

3. An apparatus as claimed in claim 2 wherein said rotary cutting-knife means are disc-shaped with a serrated cutting edge along the periphery thereof.

4. An apparatus as claimed in claim 2 wherein said upper and lower feed-belts have a slip preventing rugged surface.

5. An apparatus as claimed in claim 4 wherein said at least one depressing plate is supported with the aid of resilient members.

* * * * *